(12) United States Patent
Schnittger et al.

(10) Patent No.: US 11,479,226 B2
(45) Date of Patent: Oct. 25, 2022

(54) PARKING BRAKE DEVICE FOR A MOTOR VEHICLE

(71) Applicant: KNORR-BREMSE Systeme fuer Nutzfahrzeuge GmbH, Munich (DE)

(72) Inventors: Karsten Schnittger, Munich (DE); Fabian Griesser, Munich (DE)

(73) Assignee: KNORR-BREMSE Systeme fur Nutzfahrzeuge GmbH, Munich (DE)

(*) Notice: Subject to any disclaimer, the term of this patent is extended or adjusted under 35 U.S.C. 154(b) by 145 days.

(21) Appl. No.: 17/253,942

(22) PCT Filed: Jun. 18, 2019

(86) PCT No.: PCT/EP2019/065937
§ 371 (c)(1),
(2) Date: Dec. 18, 2020

(87) PCT Pub. No.: WO2019/243284
PCT Pub. Date: Dec. 26, 2019

(65) Prior Publication Data
US 2021/0245723 A1   Aug. 12, 2021

(30) Foreign Application Priority Data

Jun. 19, 2018 (DE) ...................... 10 2018 114 636.1

(51) Int. Cl.
*B60T 13/68* (2006.01)
*B60T 13/26* (2006.01)
*B60T 13/38* (2006.01)

(52) U.S. Cl.
CPC .......... *B60T 13/683* (2013.01); *B60T 13/263* (2013.01); *B60T 13/385* (2013.01)

(58) Field of Classification Search
CPC .......... B60T 13/26; B60T 13/38; B60T 13/66; B60T 13/68; B60T 13/203; B60T 13/263; B60T 13/385; B60T 13/662; B60T 13/683
See application file for complete search history.

(56) References Cited

U.S. PATENT DOCUMENTS

2009/0309413 A1   12/2009  Bensch et al.
2014/0103237 A1*  4/2014   Herges ................. B60T 15/181
                                                    251/129.01

(Continued)

FOREIGN PATENT DOCUMENTS

CN       106882174 A        6/2017
DE    10 2006 041 010 A1    3/2008

(Continued)

OTHER PUBLICATIONS

International Preliminary Report on Patentability (PCT/IB/326 & PCT/IB/373) issued in PCT Application No. EP2019/065937 dated Dec. 30, 2020, including English translation of document C2 (German-language Written Opinion (PCT/ISA/237) filed on Dec. 18, 2020) (eight (8) pages).

(Continued)

*Primary Examiner* — Robert A. Siconolfi
*Assistant Examiner* — San M Aung
(74) *Attorney, Agent, or Firm* — Crowell & Moring LLP

(57) ABSTRACT

A parking brake device for motor vehicles has at least one first parking brake unit and one second parking brake unit, wherein the first parking brake unit has at least one first compressed air connector, a first inlet-ventilation solenoid valve unit, a first relay valve, a spring brake valve and at least one first compressed air outlet. The first compressed air connector is connected to the first inlet-ventilation solenoid valve unit and the first relay valve. A first control line is provided in the first parking brake unit in such a way that the first relay valve is connected to the first inlet-ventilation (Continued)

solenoid valve unit, wherein the first control line has a first branch upstream of the first relay valve, and wherein a first outlet line is provided in the first parking brake unit, which first outlet line is connected to the at least one first compressed air outlet and has a first outlet branch. A spring brake line is provided in the first parking brake unit, which spring brake line is connected via a first branch to the first control line and via the first outlet branch to the outlet line. The first parking brake unit has a spring brake valve which is arranged in the spring brake line and is connected to the first relay valve, and a first throttle unit which is arranged in the spring brake line between the first outlet branch of the first outlet line and the first branch of the first control line.

9 Claims, 5 Drawing Sheets

(56) References Cited

U.S. PATENT DOCUMENTS

| | | |
|---|---|---|
| 2015/0084402 A1 | 3/2015 | Tober et al. |
| 2018/0251112 A1 | 9/2018 | Griesser et al. |

FOREIGN PATENT DOCUMENTS

| | | | | |
|---|---|---|---|---|
| DE | 10 2006 055 570 A1 | | 5/2008 | |
| DE | 10 2008 014 458 A1 | | 9/2009 | |
| DE | 102008048207 B4 | * | 6/2011 | ............ B60T 13/385 |
| DE | 10 2014 013 882 A1 | | 3/2015 | |
| DE | 102015106146 A1 | * | 10/2016 | ............ B60T 13/263 |
| DE | 102015112490 A1 | * | 2/2017 | ............ B60T 13/683 |
| DE | 10 2015 118 290 A1 | | 4/2017 | |
| DE | 10 2015 119 136 A1 | | 5/2017 | |
| EP | 3112230 A1 | * | 1/2017 | .............. B60T 13/22 |
| WO | WO 2015/154787 A1 | | 10/2015 | |
| WO | WO-2015154788 A1 | * | 10/2015 | ............. B60T 13/68 |
| WO | WO 2016/169972 A1 | | 10/2016 | |
| WO | WO-2016169973 A1 | * | 10/2016 | ............ B60T 13/263 |

OTHER PUBLICATIONS

International Search Report (PCT/ISA/210) issued in PCT Application No. PCT/EP2019/065937 dated Oct. 25, 2019 with English translation (five (5) pages).

German-language Written Opinion (PCT/ISA/237) issued in PCT Application No. PCT/EP2019/065937 dated Oct. 25, 2019 (six (6) pages).

German-language Office Action issued in German Application No. 10 2018 114 636.1 dated Mar. 12, 2020 (eight (8) pages).

* cited by examiner

PARKING BRAKE DEVICE FOR A MOTOR VEHICLE

BACKGROUND AND SUMMARY OF THE INVENTION

The present invention relates to a parking brake device for motor vehicles, in particular a parking brake device having at least one first parking brake unit and one second parking brake unit.

Parking brakes (also referred to as immobilizing brakes) of utility vehicles including trailers and rail vehicles are nowadays commonly equipped with spring-loaded brake cylinders which, in a release position, charge a spring compression chamber with compressed air and thus hold the spring under stress, whereas, for a parking braking action, the spring compression chamber is ventilated, that is to say connected to atmospheric pressure, such that the brake cylinder generates a braking force under the action of the spring (cf. Bosch, Automotive Handbook, 22nd edition, Düsseldorf, 1995, page 648).

Inter alia, in the use of electronic parking brakes in the USA, it must be taken into consideration that, for a tractor vehicle and a trailer of a motor vehicle, it is necessary for respectively separate units of an electronic parking brake device, with mutually independent pneumatic circuits, to be provided.

WO 2015/154 787 A1 has already disclosed an electronic parking brake which utilizes a relay valve, the piston of which is designed as a stepped piston and exhibits feedback of the relay valve output to the control chamber of the relay valve. A restrictor unit is provided in the feedback path. However, pressure losses arise, in particular during the ventilation of the device, owing to the feedback with the restrictor unit. A readjustment is required, wherein solenoid valves for aeration and ventilation must be correspondingly switched.

It is therefore the object of the present invention to advantageously further develop a parking brake device of the type mentioned in the introduction, in particular such that a parking brake device can be of relatively simple construction and can be aerated and ventilated in a relatively controlled manner.

The object is achieved according to the invention by means of a parking brake device for motor vehicles having the features of the independent claim. According to the claim, a parking brake device is provided, having at least one first parking brake unit and one second parking brake unit, wherein the first parking brake unit has at least one first compressed-air port, a first inlet ventilation solenoid valve unit, a first relay valve, a spring brake valve and at least one first compressed-air output, wherein the first compressed-air port is connected to the first inlet ventilation solenoid valve unit and to the first relay valve, wherein a first control line is provided in the first parking brake unit such that the first relay valve is connected to the first inlet ventilation solenoid valve unit, wherein the first control line has a first branching point upstream of the first relay valve, wherein a first output line is provided in the first parking brake unit, which first output line is connected to the at least one first compressed-air output and has a first output branching point, wherein a spring brake line is provided in the first parking brake unit, which spring brake line is connected via the first branching point to the first control line and via the first output branching point to the first output line, wherein the first parking brake unit has a spring brake valve, which is arranged in the spring brake line and is connected to the first relay valve, and a first restrictor unit, which is arranged in the spring brake line between the first output branching point of the first output line and the first branching point of the first control line.

In particular, the first parking brake unit of the parking brake device may be provided for a tractor vehicle of a motor vehicle, wherein the second parking brake unit may be provided for a trailer.

The invention is based on the underlying concept of both a spring brake valve and a first restrictor unit being provided in the spring brake line of the first parking brake unit.

The spring brake valve and the first restrictor unit are in particular connected to the first relay valve via the spring brake line, the first branching point and the first control line.

Furthermore, the spring brake line with the spring brake valve is connected via the first control line to the first inlet ventilation solenoid valve unit. In this way, it is possible for ventilation or aeration of at least one spring brake cylinder to be controlled, or shut off if necessary, in accordance with demand and in a highly accurate manner by means of the spring brake valve and the first restrictor unit.

In the context of the present invention, it is preferably provided that the relay valve is in the form of a bistable element.

The first relay valve preferably has an input, an output or working output, a control input and a ventilation output. The first control line is connected via the control input to the first relay valve. The compressed-air source is connected to the input of the first relay valve. The output or working output of the first relay valve is preferably connected or connectable via the first output line to at least one spring-loaded brake cylinder.

A connection between the input and the output or working output of the first relay valve is producible and controllable by virtue of a specific pressure being applied to the control input.

The specific pressure must be equal to or higher than a threshold pressure in order to be able to provide a connection between input and output of the first relay valve. When the threshold pressure is attained, the ventilation output of the first relay valve is closed.

A connection between the input and the output of the first relay valve can be controlled in accordance with demand by means of fluid pressures which are at least equal to or higher than the predeterminable threshold pressure. In this way, it is advantageously possible to attain a specific pressure at the output or working output of the first relay valve.

It is furthermore possible for the spring brake line connected to the first branching point and the first output branching point to form, via the first restrictor unit and the spring brake valve, a feedback connection between a control input and an output of the first relay valve. In particular, a feedback connection may be present if the spring brake valve is switched into an electrically deenergized open position.

It is thus possible for a pressure from the output or working output of the first relay valve to be usable as required for the control of the first relay valve.

In particular, a connection between the input and the output of the relay valve can be obtained by virtue of the fact that the pressure at the output of the relay valve can be fed back to the control input of the relay valve.

A loss of air during the aeration and ventilation can be avoided at the output of the first relay valve by means of the spring brake line which can be shut off by means of the spring brake valve. Switching between the operating states is performed more quickly and more precisely.

The spring brake line is preferably connected via the first control line to the control input of the first relay valve. Furthermore, the spring brake line is connected via the first output line to the output or working output of the first relay valve.

In particular, the first restrictor unit may be arranged, along the spring brake line, between the first branching point and the spring brake valve.

Alternatively, the first restrictor unit may be arranged, along the spring brake line, between the spring brake valve and the first output branching point.

In this context, the first restrictor unit is, in a manner dependent on the specific state or switching state of the first parking brake unit, provided upstream or downstream of the spring brake valve along the spring brake line.

Alternatively, the first parking brake unit may also be provided without a spring brake valve in the spring brake line. In this case, only the first restrictor unit is arranged in the spring brake line which provides feedback.

In particular, the spring brake valve may optionally be omitted, such that less-expensive parking brake devices or first parking brake units with lower adjustment or actuation accuracy are also available if required.

By means of the combination of spring brake valve and first restrictor unit in the spring brake line, it is possible in particular to avoid a loss of air during the course of a switching process between different operating modes of a motor vehicle with the parking brake device according to the invention. A switching process between the operating states can be performed more quickly, more efficiently and more precisely. In particular, through the prevention of a loss of air, no readjustment of compressed air is necessary.

As operating modes, a driving state, a parked state or a graduable braking state of the parking brake device may be provided for the motor vehicle.

For the graduable braking state, a demand-dependent constant pressure can be set at the output of the first relay valve in order to attain any desired braking action.

In the context of the present invention, a constant pressure may be understood in particular also to mean a pressure range with a preferably predefinable maximum pressure and minimum pressure to be adhered to.

In particular, the pressure may lie between 0 bar and the maximum system pressure.

In the context of the present invention, a constant pressure or pressure range may in particular be set or held intermittently.

At the output of the first relay valve, a pressure can be provided which is preferably proportional to the pressure at the control input of the first relay valve.

Alternatively, it is furthermore possible for a stretch-brake state to be provided by means of the parking brake device according to the invention. It is thus possible, by means of a preferably graduable application of the brakes of the trailer, for the motor vehicle, with for example a tractor vehicle and a trailer, to be stretched, and thus to be stabilized.

Preferably, in this context, a parking brake and a service brake of the tractor vehicle are released in the stretch-brake state, wherein a parking brake, preferably at least one spring-loaded brake cylinder, of the trailer is activated, in particular is activatable in graduable fashion.

In this context, a motor vehicle, in particular a utility vehicle, is to be understood preferably to mean a tractor vehicle with at least one trailer.

The switching between, for example, a driving state, a parked state or a graduable braking state can be performed more quickly and in a more controlled manner in particular by means of the parking brake device according to the invention.

It is furthermore possible for the spring brake valve to be provided as a solenoid valve which is open when electrically deenergized. Feedback is thus advantageously realized between the output of the first relay valve and the control input.

In the electrically deenergized state, advantageous feedback between output and control input of the first relay valve is provided, which feedback can be eliminated if required by switching of the spring brake valve. It is thus possible for a pressure from the output or working output of the first relay valve to be usable as required for the control of the first relay valve.

Furthermore, the spring brake valve may advantageously remain in the electrically deenergized open switching position during an operating state, and must merely be switched in order to change the operating state.

A loss of air during the aeration and ventilation can be avoided by means of the spring brake valve along the spring brake line. Switching between the operating states is performed more quickly, more efficiently and more precisely.

In the context of the present invention, valves are preferably provided as solenoid valves with a resetting spring. By means of electromagnetically switchable, spring-loaded valves, it is possible to ensure an electrically deenergized switching state at all times, in particular as soon as a switching state effected in a targeted manner, for example by electromagnetic switching, is ended.

It is furthermore possible for a constant pressure at the output of the first relay valve or of the first parking brake unit to be controlled in open-loop and/or closed-loop fashion through switching of the spring brake valve.

Furthermore, the first inlet ventilation solenoid valve unit may be designed such that at least one first inlet solenoid valve is provided between the first compressed-air port and the first control line, and a first ventilation solenoid valve is provided between the first control line and a first ventilation output.

In this context, the ventilation solenoid valve may have the ventilation output.

The first control line opens, upstream of the first relay valve, into the preferably independent first inlet valve and the independent first ventilation valve within the first inlet ventilation solenoid valve unit.

Alternatively, it may be provided that the first inlet ventilation solenoid valve unit has a combined solenoid valve as combined first inlet ventilation valve with the first ventilation output. In this case, in the first inlet ventilation solenoid valve unit, a first holding valve is preferably provided between the combined first inlet ventilation valve and the first branching point of the first control line.

It is thus possible to achieve targeted controllability of the volumes within the first parking brake unit of the parking brake device, in particular for the aeration and ventilation of the control input of the first relay valve.

It may furthermore be provided that the second parking brake unit has at least one second compressed-air port, a second inlet ventilation solenoid valve unit, a second relay valve and at least one further compressed-air output, wherein the second compressed-air port is connected to the second relay valve, wherein a second control line is provided in the second parking brake unit such that the second relay valve is connected to the second inlet ventilation solenoid valve unit, wherein the second control line has a second branching point upstream of the second relay valve, wherein a second output line is provided in the second parking brake unit, which second output line is connected to the at least one further compressed-air output and has a second output branching point, wherein a feedback line is provided in the second parking brake unit, which feedback line is connected via the second branching point to the second control line and via the second output branching point to the second output line, wherein the second parking brake unit has a second restrictor unit, which is arranged in the feedback line between the second output branching point (81b) of the second output line and the second branching point of the second control line.

Furthermore, the first parking brake unit has, by comparison, a spring brake valve in the feedback connection between the first output branching point and the first branching point of the first control line.

By contrast, the second parking brake unit is provided in particular without a spring brake valve in the feedback line.

Furthermore, the second inlet ventilation solenoid valve unit and the second relay valve are preferably of similar or identical configuration to the first inlet ventilation solenoid valve unit and the first relay valve.

The first parking brake unit is preferably provided for providing a service brake output and a first spring-loaded brake cylinder output, as first and second compressed-air output, for a tractor vehicle. The service brake and the parking brake of a tractor vehicle can thus be aerated and ventilated in an expedient manner.

In this context, the first parking brake unit may furthermore have an in particular pressure-controlled shuttle-type check valve, in that is connected to the service brake output and to the spring-loaded brake cylinder output and to the output of the first relay valve.

The shuttle-type check valve is preferably provided as a so-called select-high valve.

The second parking brake unit is preferably provided for controlling at least one spring-loaded brake cylinder of the trailer. A parking brake of the trailer is thus controllable by means of the second parking brake unit.

In this context, the second parking brake unit may have a second spring-loaded brake cylinder output as a further compressed-air output, which is connected via the second output line to the output or working output of the second relay valve.

The first parking brake unit and the second parking brake unit thus provide, in combination with one another, a parking brake device for the activation of the brake systems of a motor vehicle, in particular of a tractor vehicle and of a trailer, in accordance with demand.

In particular, it is provided that the first parking brake unit and the second parking brake unit are controllable independently of one another. It is thus possible for the tractor vehicle and the trailer to be actuated separately and independently of one another and to impart a braking action in accordance with demand.

It is furthermore provided that the second inlet ventilation solenoid valve unit is connected to the second compressed-air port.

In particular, in the context of the present invention, it may be provided that the first and second compressed-air port are connected to a common compressed-air source.

Alternatively, in the context of the present invention, it may be provided that the first and second compressed-air port are formed as a common compressed-air port.

It is possible that the feedback line connected to the second branching point and the second output branching point forms, via the second restrictor unit, a feedback connection between a control input and an output of the second relay valve.

By means of the feedback line, there is a continuous connection between the output or working output of the second relay valve and the control input of the second relay valve.

As soon as the control input of the second relay valve is aerated with an adequate air pressure, compressed air can be provided at the output of the second relay valve via a connection between the input and the output of the relay valve.

Here, the adequate air pressure is based on a preferably predefinable threshold pressure of the second relay valve.

The feed of additional compressed air to the control input of the second relay valve via the inlet ventilation solenoid valve unit is subsequently no longer imperatively necessary in order to maintain the operation of the second relay valve. A high or specific pressure can to provide at the output of the second relay valve.

The functionality of the second relay valve thus corresponds to the functionality of the first relay valve.

Furthermore, the second inlet ventilation solenoid valve unit may be configured with at least one second inlet valve, one second ventilation valve and one second ventilation output such that the second inlet valve is provided so as to be connected to the second control line and a second ventilation valve is provided between the second control line and a second ventilation output.

Likewise as discussed with reference to the first inlet ventilation solenoid valve unit, the second control line opens, upstream of the second relay valve, into the preferably independent second inlet valve and the independent second ventilation valve within the second inlet ventilation solenoid valve unit.

Alternatively, it may be provided that the second inlet ventilation solenoid valve unit has a combined solenoid valve as combined second inlet ventilation valve with the second ventilation output. In this case, in the second inlet ventilation solenoid valve unit, a second holding valve is preferably provided between the combined second inlet ventilation valve and the second branching point of the second control line.

It is thus possible to achieve targeted controllability of the volumes within the second parking brake unit, in particular for the aeration and ventilation of the control input of the second relay valve.

The functionality of the second inlet ventilation solenoid valve unit thus corresponds to the functionality of the first inlet ventilation solenoid valve unit.

It is furthermore possible for the first and second inlet valve to be provided as solenoid valves which are closed when electrically deenergized. Thus, an aeration or ventilation of the first and second parking brake unit, in particular for the control of the first and second relay valve, is required only for switching of the operating states.

It is preferably possible for an operating state, in particular a driving state or a parked state, to be implemented, wherein the first and second inlet valve and the first and second ventilation valve of the first and second inlet ventilation solenoid valve unit are closed when electrically deenergized.

During a driving state or a parked state of the motor vehicle, switching of the first or second inlet valve or of the first or second ventilation valve is not necessary.

Further details and advantages of the invention will now be discussed on the basis of an exemplary embodiment which is illustrated in more detail in the drawings.

DETAILED DESCRIPTION OF THE DRAWINGS

Figure 1:
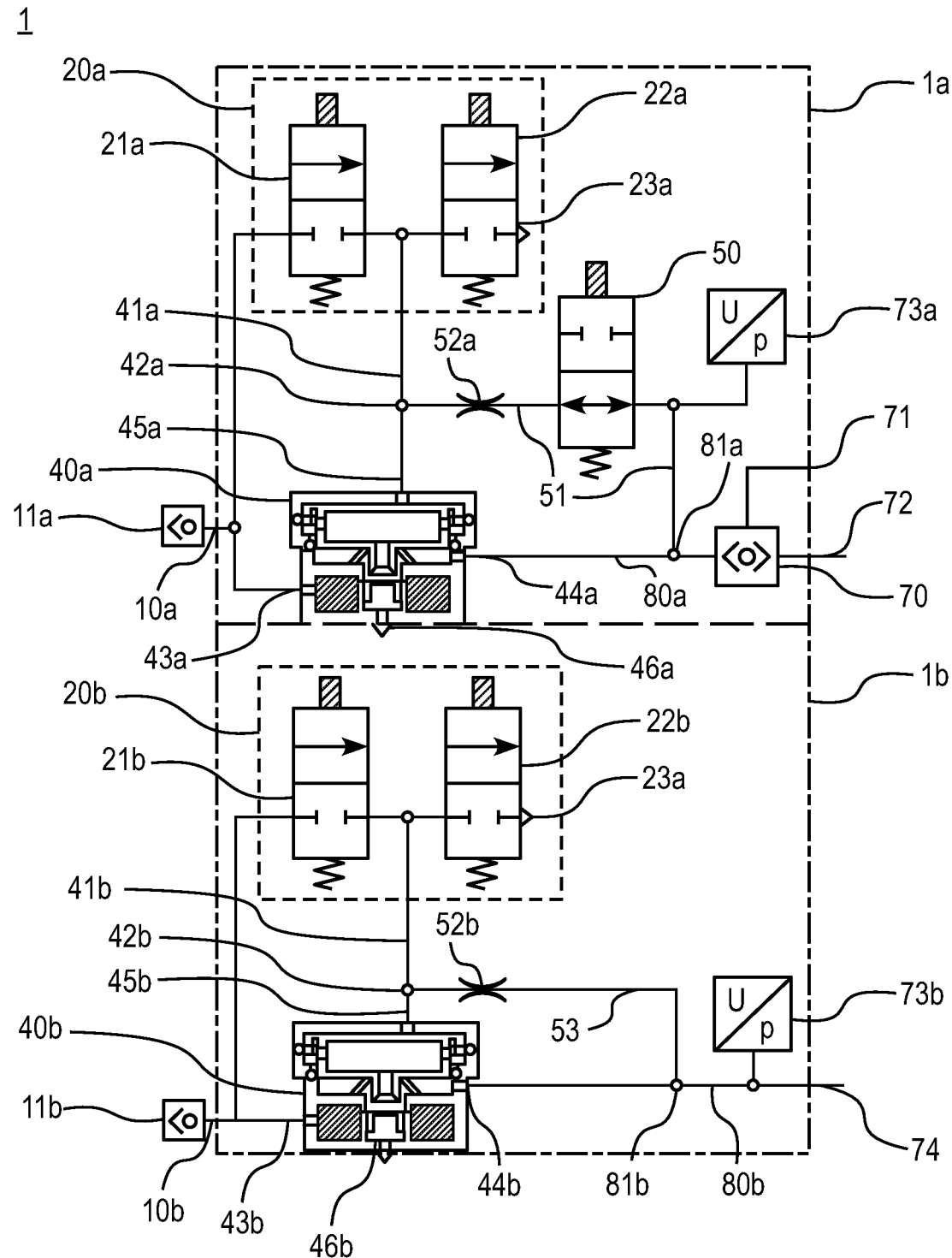
FIG. 1 shows an exemplary embodiment of a parking brake device with a first and a second parking brake unit in a parked state.

FIG. 1 shows, in a schematic illustration, a parking brake device 1 for a motor vehicle, in this case a utility vehicle.

The parking brake device 1 has a first parking brake unit 1a for a tractor vehicle and a second parking brake unit 1b for a trailer.

The first parking brake unit 1a and the second parking brake unit 1b are preferably used in combination with one another as a parking brake device 1.

The first parking brake unit 1b has a first compressed-air port 10a, a first inlet ventilation solenoid valve unit 20a and a first relay valve 40a.

The first relay valve 40a is provided with an input 43a, with an output or working output 44a, a control input 45a and a ventilation output 46a. The first compressed-air port 10a is connected to the input 40a of the first relay valve 40a.

The first relay valve 40a constitutes a bistable element.

In a manner dependent on the pressure at the control input 45a, it is possible at the output 44a of the first relay valve 40a to replicate different operating states of the first parking brake unit 1a in the form of air pressures, in particular a parked state, a driving state and a graduated braking state.

In particular, the exemplary embodiment is illustrated in the parked state in FIG. 1.

Furthermore, in the context of the first exemplary embodiment as per FIG. 1, it is also possible for a stretch-brake state to be provided.

The first inlet ventilation solenoid valve unit 20a is provided with a first inlet valve 21a and a first ventilation valve 22a. As per FIG. 1, the first ventilation valve 22a has a first ventilation output 23a.

The first inlet valve 21a and the first ventilation valve 22a are provided as 2/2 directional valves.

The first inlet valve 21a first is configured to be closed when electrically deenergized. The first ventilation valve 22a is configured to be closed when electrically deenergized.

The first compressed-air port 10a is connected to the first inlet input solenoid valve unit 20a, in particular to the first inlet valve 21a.

The first compressed-air port 10a is in this case represented by a compressed-air source (not illustrated in any more detail) and by a depicted first check valve 11a.

The first parking brake unit 1 is furthermore provided with a first control line 41a.

The first control line 41a is connected to the first inlet ventilation solenoid valve unit 20a such that the first inlet valve 21a and the first ventilation valve 22a are connected independently of one another to the first control line 41a.

The first control line 41 is connected to the control input 45a of the first relay valve 40a. A connection is thus available between the first inlet ventilation solenoid valve unit 20a and the first control input 45a of the first relay valve 40a.

The first control line 41a has, upstream of the first relay valve 40a, a first branching point 42a.

Furthermore, the first parking brake unit 1a has a spring brake line 51. The spring brake line 51 is connected via the first branching point 42a to the first control line 41a.

There is thus a connection between the spring brake line 51 and the control input 45a of the first relay valve 40a.

Furthermore, the spring brake line 51 is connected via a first output branching point 81a to a first output line 80a.

The first output line 80a is connected to the output 44a of the first relay valve 40a, and likewise to at least one compressed-air output 71 and 72 of the first parking brake unit 1a.

Thus, the spring brake line 51 is connected via the first output branching point 81a to the output or working output 44a of the first relay valve 40a.

In this context, the spring brake line 51 forms a feedback connection between the output 44a and the control input 45a of the first relay valve 40.

From the output 44a of the first relay valve 40a, compressed air can, as per FIG. 1, be conducted along the first output line 80a via a shuttle-type check valve 70 to a spring-loaded brake cylinder output 71 of the first parking brake unit 1a for the tractor vehicle of a motor vehicle.

The shuttle-type check valve 70 is connected via the first output line 80a to the spring brake line 51, to the spring-loaded brake cylinder output 71 and to a service brake output 72 of the first parking brake unit 1a for a tractor vehicle.

In this context, the spring-loaded brake cylinder output 71 and the service brake output 72 constitute compressed-air outputs of the first parking brake unit 1a.

With regard to its switching behavior, the shuttle-type check valve 70 follows the prevailing pressure gradient.

The shuttle-type check valve 70 is preferably provided as a so-called select-high valve.

It is thus possible for the spring-loaded brake cylinder output 71 to be aerated with a high pressure of the output 44a of the first relay valve 40a, wherein the connection to the service brake output 72, at which a relatively low pressure prevails, is blocked.

Furthermore, in the event of an actuation of the service brake and an associated pressure build-up at the service brake output 72, a transfer of compressed air from the service brake output 72 to the spring-loaded brake cylinder output 71 is possible via the shuttle-type check valve 70.

If a higher pressure prevails at the service brake output 72 than at the output 44a of the first relay valve 40a, the shuttle-type check valve 70 opens a connection between the service brake output 72 and the spring-loaded brake cylinder output 71, in accordance with the pressure gradient.

A combined braking action in the event of actuation of the service brake of the tractor vehicle at the service brake output 72 in combination with at least one spring-loaded brake cylinder of the tractor vehicle at the spring-loaded brake cylinder output 71 can be attained by means of the shuttle-type check valve 70.

Furthermore, a spring brake valve 50 is arranged in the spring brake line 51. Thus, the spring brake valve 50 is connected to the control input 45a and to the output 44a of the first relay valve 40a.

The spring brake valve 50 is switched into the electrically deenergized open position.

In FIG. 1, the spring brake valve 50 is provided as a 2/2 directional valve.

A first restrictor unit 52a is arranged in the spring brake line 51 between the first relay valve 40a and the first branching point 42a of the first control line 41a, in particular between the spring brake valve 50 and the first branching point 42a of the first control line 41a.

In general, in the context of the present invention, it is preferably always provided that the first restrictor unit 52a and the spring brake valve 50 are arranged along the spring brake line 51 between the first branching point 41a of the first control line 41a and the first output branching point 81a of the first output line 80a.

A connection of the first relay valve 40a, in particular of the output 44a, and of the shuttle-type check valve 70, in particular of the service brake output 72 and/or of the spring-loaded brake cylinder output 71, to the first control line 41a along the spring brake line 51 is controllable by means of the spring brake valve 50 and the first restrictor unit 52.

By means of the spring brake line 51, which provides feedback and which has the first restrictor unit 52a and the spring brake valve 50, the fluid pressure or air pressure at the output 44a of the first relay valve 40a can be targetedly set and controlled in open-loop and/or closed-loop fashion.

A first compressed-air sensor 73a is furthermore arranged between the spring brake valve 50 and the output 44a of the first relay valve 40a. The air pressure or fluid pressure at the output 44a of the first relay valve 40a can thus be targetedly controlled in open-loop and/or closed-loop fashion.

Furthermore, in FIG. 1, the second parking brake unit 1b is shown.

The second parking brake unit 1b has a second compressed-air port 10b, a second relay valve 40b and a second inlet ventilation solenoid valve unit 20b.

The second compressed-air port 10b is represented here by a compressed-air source (not illustrated in any more detail) and a depicted second check valve 11b.

In particular, in the context of the present invention, it may be provided that the first and second compressed-air port 10a and 10b are connected to a common compressed-air source.

Alternatively, in the context of the present invention, it may be provided that the first and second compressed-air port 10a and 10b are formed as a common compressed-air port.

The second inlet ventilation solenoid valve unit 20b is shown with a second inlet valve 21b, a second ventilation valve 22b and a second ventilation output 23b.

The second ventilation input 23b may, as per FIG. 1, be provided so as to be integrated in the second ventilation valve 22b.

The second inlet ventilation solenoid valve unit 20b is thus of similar configuration to the first inlet ventilation solenoid valve unit 20a.

The second inlet valve 21b is preferably connected to the second compressed-air port 10b.

Furthermore, the second parking brake unit 1b has a second control line 41b.

The second inlet ventilation solenoid valve unit 20b and the second relay valve 40b are connected to one another via the second control line 41b.

Like the first relay valve 40a, the second relay valve 40b has an input 43b, an output 44b, a control input 45b and a ventilation output 46b.

The second control line 41b is connected to the control input 45b of the second relay valve 40b.

The functioning of the first and second relay valve 40a; 40b is preferably identical.

A second branching point 42b is provided in the second control line 41b upstream of the second relay valve 40b.

Furthermore, the second parking brake unit 1b has a feedback line 53 which is connected via the second branching point 42b to the second control line 41b.

The feedback line 53 is connected via a second output branching point 81b to a second output line 80b.

The second output line 80b is connected to the output 44b of the second relay valve 40b.

The feedback line 53 thus provides feedback from the output 44b of the second relay valve 40b via the second output line 80b, the second output branching point 81, the second branching point 42b and the control line 41b to the control input 45b of the second relay valve 40b.

In the feedback line 53, a second restrictor unit 52b is arranged between the second output branching point 81b of the second output line 80b and the second branching point 42b of the second control line 41b.

With the feedback line 53 and the second restrictor unit 52b, there is thus continuously feedback between the output 44b and the control input 45b of the second relay valve 40b.

The second parking brake unit 1b furthermore has a trailer control output 74 as a further compressed-air output for connection to at least one spring-loaded brake cylinder of a trailer.

In general, in the context of the present invention, it is preferably always provided that the second restrictor unit 52b is arranged along the feedback line 53 between the second branching point 42b of the second control line 41b and the second output discharge line 81b of the second output line 80b.

A connection of the second relay valve 40b, in particular of the output 44b, and of the trailer control output 74 to the second control line 41b along the feedback line 53 is available via the second restrictor unit 52b.

Furthermore, a second pressure sensor 73b is arranged along the second output line 80b. In this way, it is possible to detect a set pressure at the output 44b of the second relay valve 40b, which pressure can propagate to the trailer control output 74.

The first parking brake unit 1a and the second parking brake unit 1b are thus substantially of similar construction to one another.

The first parking brake unit 1a differs, as per FIG. 1, substantially by the arrangement of the spring brake valve 50 in the spring brake line 51 that provides feedback.

Furthermore, substantial differences of the first parking brake unit 1a lie in the arrangement of the shuttle-type check valve 70 for the connection of the spring-loaded brake cylinder output 71 and of the service brake output 72 to the output 44a of the first relay valve 40a.

The functioning of the parking brake device 1 as per FIGS. 1 to 5 will be discussed below.

In a parked state (as illustrated in FIG. 1), the first and the second inlet valve 21a; 21b are switched into an electrically deenergized closed position. It is thus not possible for compressed air from the first compressed-air port 10a or from an external compressed-air source to pass into the first control line 41*a* or the second control line 41*b*.

The spring brake valve 50 of the first parking brake unit 1*a* is switched into the electrically deenergized open position. There is thus feedback in each case between the output 44*a*; 44*b* and the control input 45*a*; 45*b* of the first and second relay valve 40*a*; 40*b*.

Furthermore, compressed air is supplied to the input 43*a*; 43*b* of the first and second relay valve 40*a*; 40*b*.

By virtue of the fact that no pressure prevails at the control inputs 45*a*; 45*b* of the first and second relay valve 40*a*; 40*b*, the respective ventilation outputs 46*a*; 46*b* are open.

The spring brake line 51 and the feedback line 53 are ventilated via the ventilation outputs 46*a*; 46*b*.

By means of the spring brake valve 50 switched into the electrically deenergized open position, the first control line 41*a* is also ventilated via the ventilation output 46*a*, and likewise the second control line 41*b* is ventilated via the ventilation output 46*b*.

Thus, the spring-loaded brake cylinder output 71 of the first parking brake unit 1*a* and the trailer control output 74 of the second parking brake unit 1*b* are also ventilated. In this context, the spring-loaded brake cylinders of the tractor vehicle and of the trailer are activated and impart a braking force.

The service brake output 72 of the first parking brake unit 1*b* is ventilated in the parked state. In this context, the service brake of the tractor vehicle is released.

Figure 2:
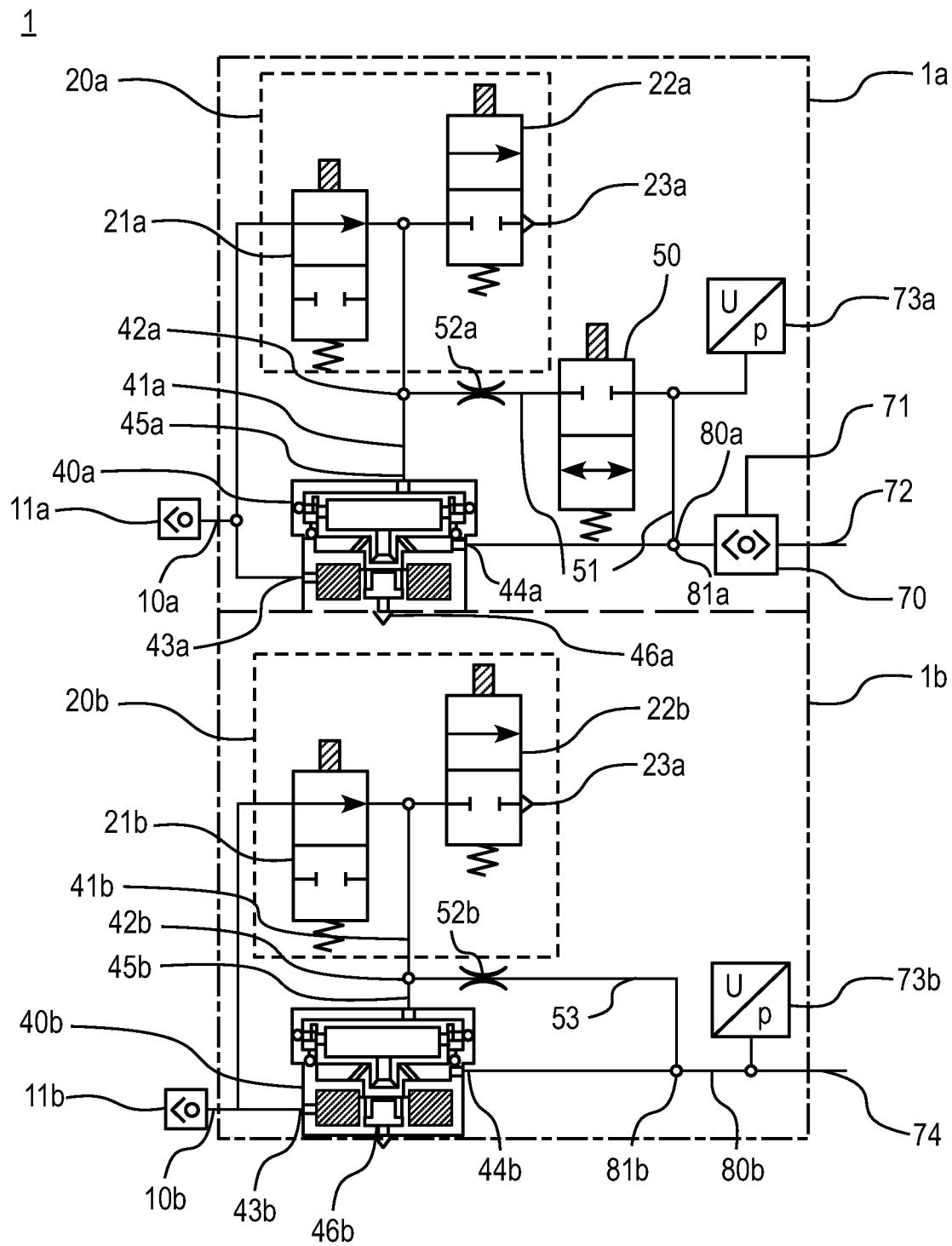
FIG. 2 shows the exemplary embodiment of a parking brake device with a first and a second parking brake unit in a switching state between a parked state and a driving state.

In order to move from a parked state to a driving state the first and the second inlet valve 21*a*; 21*b* are, as per FIG. 2, switched into an open or flow-conducting position relative to the parked state (as shown in FIG. 1).

The spring brake valve 50 is shut off or switched into a closed position. The spring brake line 51 is shut off during the change of the operating state.

Compressed air is introduced into the first and second control lines 41*a*; 41*b* through the inlet valves 21*a*; 21*b* switched into an open position. Via the control lines 41*a*; 41*b*, the control inputs 45*a*; 45*b* of the first and second relay valve 40*a*; 40*b* are aerated.

If a threshold pressure is reached or overshot, a connection between the input 43*a*; 43*b* and the output 43*a*; 43*b* is produced in each of the relay valves 40*a*; 40*b*, such that compressed air is provided at the outputs 44*a*; 44*b*.

If the threshold pressure is reached or overshot at the control inputs 45*a*; 45*b*, the ventilation outputs 46*a*; 46*b* of the first and second relay valve 40*a*; 40*b* are closed.

In the first parking brake unit 1*a*, the high pressure of the output 44*a* is, in accordance with the prevailing pressure difference, conducted onward along the second output line 80*b* via the shuttle-type check valve 70 to the spring-loaded brake cylinder output 71.

In the second parking brake unit 1*b*, the high pressure of the output 44*b* is conducted onward to the trailer control output 74.

The spring-loaded brake cylinder output 71 and the trailer control output 74 are thus aerated. In this context, the parking brakes of the tractor vehicle and of the trailer are released, such that no braking force is imparted.

By means of the spring brake valve 50 switched into a closed position, it is the case at least in the first parking brake unit 1*a* that no loss of compressed air occurs via the feedback connection in the form of the spring brake line 51. The spring-loaded brake cylinder output 71 can be aerated in a targeted and efficient manner.

Figure 3:
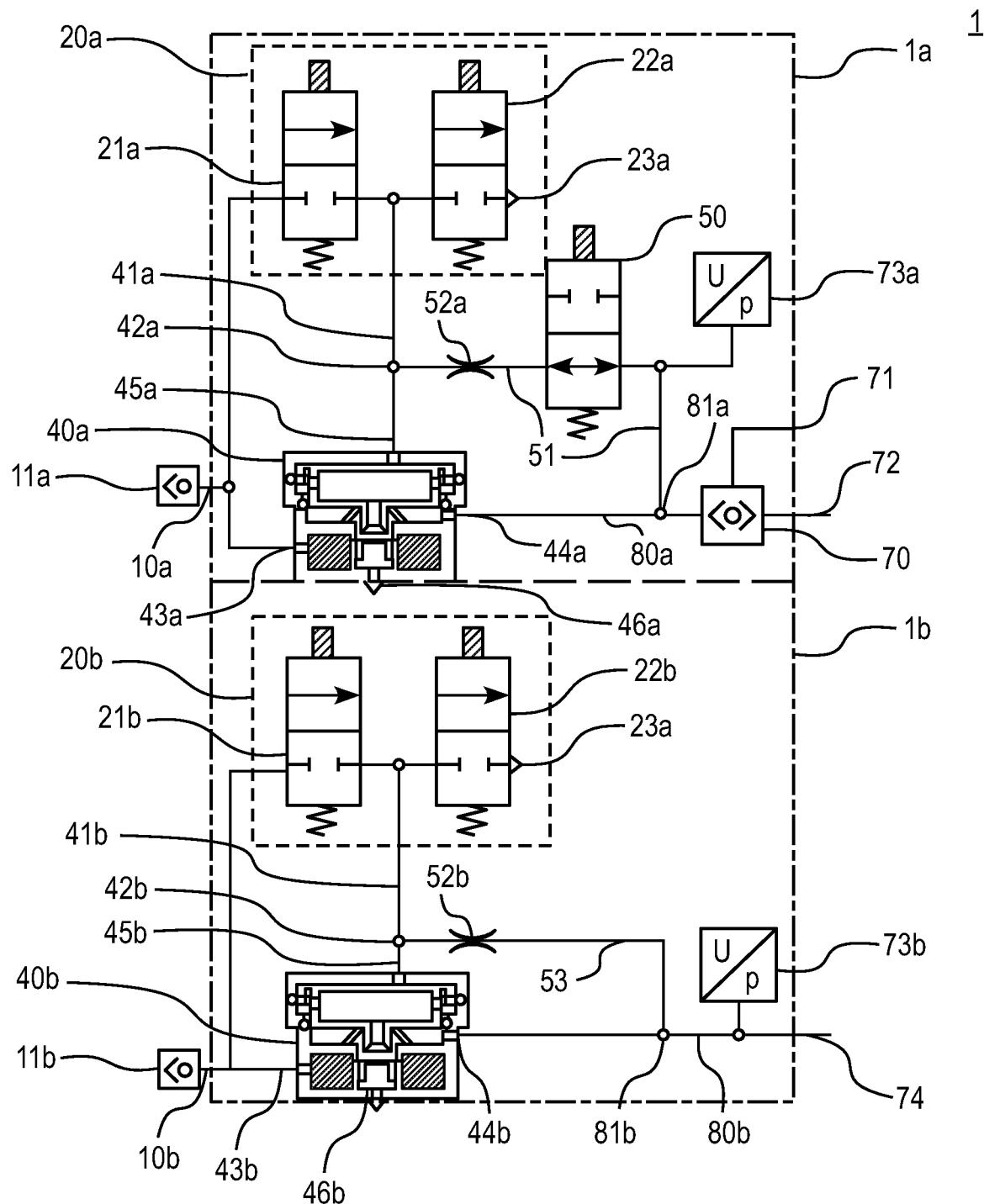
FIG. 3 shows the exemplary embodiment of a parking brake device with a first and a second parking brake unit in a driving state.

As soon as the spring-loaded brake cylinder output 71 and the trailer control output 74 have been adequately aerated, the first and the second inlet valve 21*a*; 21*b* are switched into a shut-off or closed position as per FIG. 3. The spring brake valve 50 is, as per FIG. 3, switched into an open or flow-conducting position.

Thus, the trailer control output 74 and the spring-loaded brake cylinder output 71 are aerated. The service brake output 72 for a tractor vehicle is ventilated.

In accordance with FIG. 3, a driving state of the motor vehicle, with a tractor vehicle and a trailer, is attained.

Figure 4:
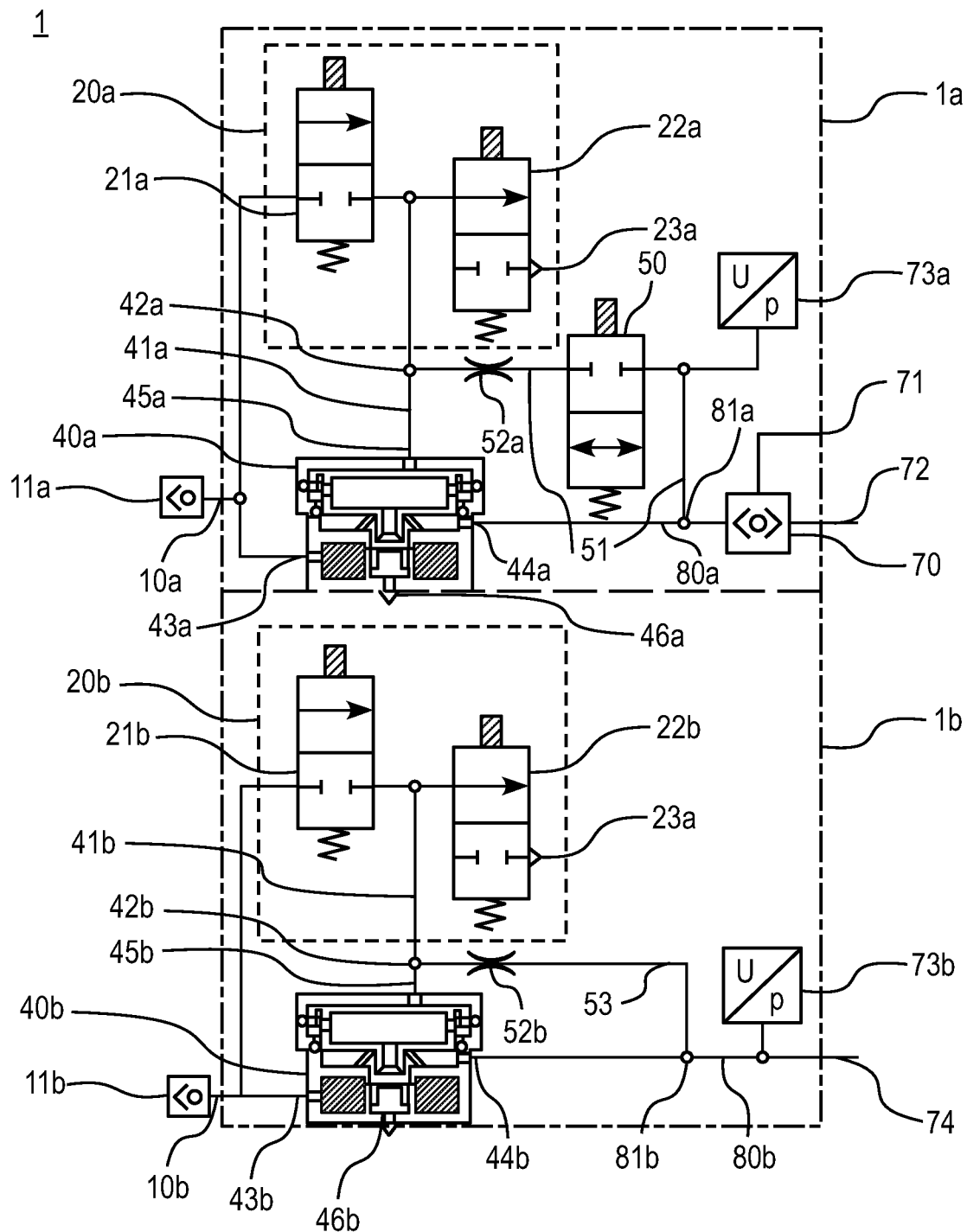
FIG. 4 shows the exemplary embodiment of a parking brake device with a first and a second parking brake unit in a switching state between a driving state and a parked state.

In order to move from a driving state into a parked state again, the first and the second ventilation valve 22*a*; 22*b* are, as per FIG. 4, in relation to the driving state (as illustrated in FIG. 3), switched into an open or flow-conducting state, such that compressed air can exit via the first and second ventilation output 23*a*; 23*b*.

The spring brake valve 50 is switched into a shut-off position.

A high pressure of the first and second control line 41*a*; 41*b* connected to the control inputs 45*a*; 45*b* is dissipated or ventilated.

By means of the decreasing pressure in the control inputs 45*a*; 45*b*, the respective connection between the inputs 43*a*; 43*b* and the outputs 44*a*; 44*b* of the first and second relay valve 40*a*; 40*b* is shut off. The ventilation outputs 46*a*; 46*b* are opened.

A high pressure from the spring brake line 51 connected to the spring brake cylinder output 71 and from the feedback line 53 connected to the trailer control output 74 is ventilated via the ventilation outputs 46*a*; 46*b*.

Owing to the continuously present feedback via the feedback line 53 with the second restrictor unit 52*b*, ventilation of the trailer control output 74 likewise occurs via the second ventilation valve 22*b* switched into an open position.

As soon as the spring-loaded brake cylinder output 71 and the trailer control output 74 have been adequately ventilated, the ventilation valves 22*a*; 22*b* are switched into a closed position, as per the parked state in FIG. 1.

Likewise, the spring brake valve 50 is moved into the electrically deenergized open switching state again.

Thus, a parked state as per FIG. 1 with the ventilated spring-loaded brake cylinder output 71 and the ventilated trailer control output 74 is attained. The parking brakes of the tractor vehicle and of the trailer, in the form of spring-loaded brake cylinders, are activated and impart a corresponding braking action.

Figure 5:
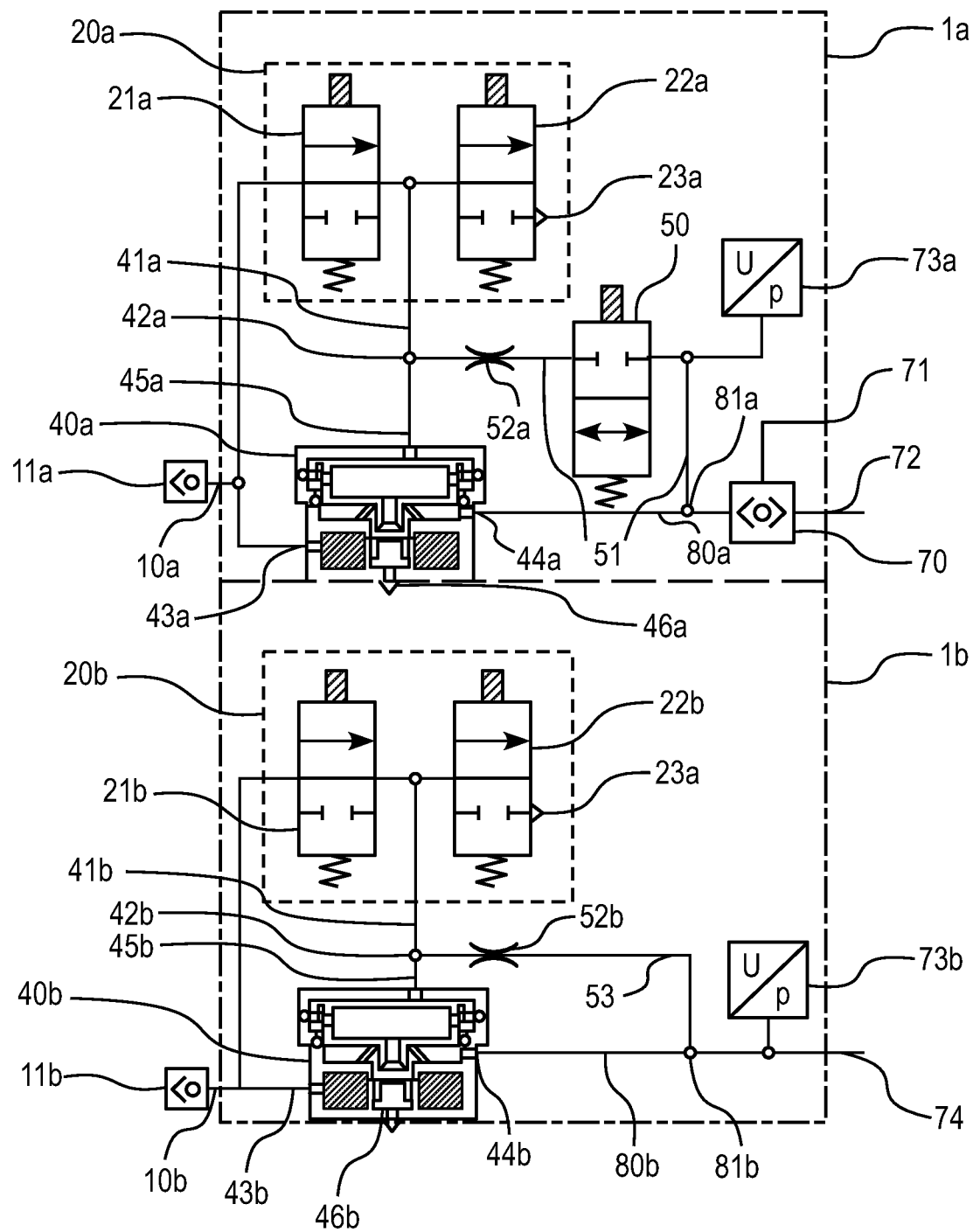
FIG. 5 shows the exemplary embodiment of a parking brake device with a first and a second parking brake unit in a graduable braking state.

Furthermore, proceeding from the driving state, a graduated braking state as per FIG. 5 can be implemented.

The spring brake valve 50 is switched into a shut-off position in FIG. 5.

Preferably, the inlet valves 21*a*; 21*b* and the ventilation valves 22*a*; 22*b* are switched into a partially open or flow-conducting position, in particular by means of multiple short successive actuations.

Compressed air is thus introduced into the first and second control line 41*a*; 41*b*. The control inputs 45*a*; 45*a* of the first and second relay valve 40*a*; 40*b* are aerated with a specific pressure which lies between 0 bar and the maximum system pressure.

The specific pressure is settable in a manner dependent on the degree of opening of the inlet valves 21*a*; 21*b* and of the ventilation valves 22*a*; 22*b*.

On the basis of the specific pressure at the control inputs 45*a*; 45*b*, preferably proportional pressures are provided at the outputs 44*a*; 44*b* of the first and second relay valve 40*a*; 40*b*.

The spring-loaded brake cylinder output 71 and the trailer control output 74 are, in accordance with FIG. 5, aerated such that a partial braking action of the tractor vehicle and of the trailer is applied.

A graduated braking state with a partial braking action of the motor vehicle can be provided.

In this context, it is possible for constant pressures to be held over a specific period of time, and varied in stepped fashion, at the outputs 44a; 44b of the first and second relay valve 40a; 40b.

By virtue of the spring-loaded brake cylinder output 71 and the trailer control output 74 being aerated with temporarily constant pressures which are changed in stepped fashion, the braking action of the tractor vehicle and of the trailer can be varied in stepped fashion.

Furthermore, it is also possible to implement a stretch-brake state with the exemplary embodiment in the context of FIGS. 1 to 5, in particular proceeding from a driving state as per FIG. 3. The switching into the operating state for the stretch-brake function is substantially based on the switching processes described above.

The spring-loaded brake cylinder output 71 is preferably aerated in the stretch-brake state.

The trailer control output 74 can be ventilated and aerated in accordance with demand, in particular by means of the second relay valve 40b connected to the second inlet ventilation solenoid valve unit 20b.

It is thus possible for the trailer control output 74 to be aerated with compressed air in an expedient, in particular graduable, manner. A graduable braking action of the trailer is available in order to stretch and thereby stabilize the motor vehicle.

In general, in the context of the present invention, advantageous switching between the operating states is thus attained by means of the first and second restrictor unit 52a; 52b and in particular by means of the spring brake valve 50 by virtue of the fact that the spring brake line 51, which provides feedback, can be shut off as required.

LIST OF REFERENCE DESIGNATIONS

1 Parking brake device
1a First parking brake unit
1b Second parking brake unit
10a First compressed-air port
10b Second compressed-air port
11a First check valve
11b Second check valve
20a First inlet ventilation solenoid valve unit
20b Second inlet ventilation solenoid valve unit
21a First inlet valve
21b Second inlet valve
22a First ventilation valve
22b Second ventilation valve
23a First ventilation output
23b Second ventilation output
40a First relay valve
40b Second relay valve
41a First control line
41b Second control line
42a First branching point
42b Second branching point
43a Input of the first relay valve
43b Input of the second relay valve
44a Output of the first relay valve
44b Output of the second relay valve
45a Control input of the first relay valve
45b Control input of the second relay valve
46a Ventilation output of the first relay valve
46b Ventilation output of the second relay valve
50 Spring brake valve
51 Spring brake line
52a First restrictor unit
52b Second restrictor unit
53 Feedback line
70 Shuttle-type check valve
71 Spring-loaded brake cylinder output
72 Service brake output
73a First compressed-air sensor
73b Second compressed-air sensor
74 Trailer control output
80a First output line
80b Second output line
81a First output branching point
81b Second output branching point

What is claimed is:

1. A parking brake device for a motor vehicle, comprising:
at least one first parking brake unit; and
one second parking brake unit,
wherein the first parking brake unit has at least one first compressed-air port, a first inlet ventilation solenoid valve unit, a first relay valve, a spring brake valve and at least one first compressed-air output,
wherein the first compressed-air port is connected to the first inlet ventilation solenoid valve unit and to the first relay valve,
wherein a first control line is provided in the first parking brake unit such that the first relay valve is connected to the first inlet ventilation solenoid valve unit,
wherein the first control line has a first branching point upstream of the first relay valve,
wherein a first output line is provided in the first parking brake unit, which first output line is connected to the at least one first compressed-air output and has a first output branching point,
wherein a spring brake line is provided in the first parking brake unit, which spring brake line is connected via the first branching point to the first control line and via the first output branching point to the output line,
wherein the first parking brake unit has a spring brake valve, which is arranged in the spring brake line and is connected to the first relay valve, and a first restrictor unit, which is arranged in the spring brake line between the first output branching point of the first output line and the first branching point of the first control line.

2. The parking brake device as claimed in claim 1, wherein
the spring brake line connected to the first branching point and the first output branching point forms, via the first restrictor unit and the spring brake valve, a feedback connection between a control input and an output of the first relay valve.

3. The parking brake device as claimed in claim 1, wherein
the spring brake valve is provided as a solenoid valve which is open when electrically deenergized.

4. The parking brake device as claimed in claim 1, wherein
the first inlet ventilation solenoid valve unit is designed such that at least one first inlet solenoid valve is provided between the first compressed-air port and the first control line, and a first ventilation solenoid valve is provided between the first control line and a first ventilation output.

5. The parking brake device as claimed in claim 1, wherein
- the second parking brake unit has at least one second compressed-air port, a second inlet ventilation solenoid valve unit, a second relay valve and at least one further compressed-air output,
- the second compressed-air port is connected to the second relay valve, wherein a second control line is provided in the second parking brake unit such that the second relay valve is connected to the second inlet ventilation solenoid valve unit,
- the second control line has a second branching point upstream of the second relay valve,
- a second output line is provided in the second parking brake unit, which second output line is connected to the at least one further compressed-air output and has a second output branching point,
- a feedback line is provided in the second parking brake unit, which feedback line is connected via the second branching point to the second control line and via the second output branching point to the second output line, and
- the second parking brake unit has a second restrictor unit, which is arranged in the feedback line between the second output branching point of the second output line and the second branching point of the second control line.

6. The parking brake device as claimed in claim 5, wherein
- the second inlet ventilation solenoid valve unit is connected to the second compressed-air port.

7. The parking brake device as claimed in claim 5, wherein
- the feedback line connected to the second branching point and the second output branching point forms, via the second restrictor unit, a feedback connection between a control input and an output of the second relay valve.

8. The parking brake device as claimed in claim 5, wherein
- the second inlet ventilation solenoid valve unit is configured with at least one second inlet valve, one second ventilation valve and one second ventilation output such that the second inlet valve is provided so as to be connected to the second control line and a second ventilation valve is provided between the second control line and a second ventilation output.

9. The parking brake device as claimed in claim 8, wherein
- the first and second inlet valve are provided as solenoid valves which are closed when electrically deenergized.

\* \* \* \* \*